(12) United States Patent
Miller et al.

(10) Patent No.: US 12,457,390 B2
(45) Date of Patent: Oct. 28, 2025

(54) SYSTEMS AND METHODS FOR PROVENANCE VERIFICATION OF USER-CAPTURED LIVE EVENT VIDEO

(71) Applicant: Mixhalo Corp., San Francisco, CA (US)

(72) Inventors: Jeffrey Thomas Miller, San Diego, CA (US); Vikram Singh, San Francisco, CA (US)

(73) Assignee: Mixhalo Corp., San Francisco, CA (US)

(*) Notice: Subject to any disclaimer, the term of this patent is extended or adjusted under 35 U.S.C. 154(b) by 78 days.

(21) Appl. No.: 18/441,057

(22) Filed: Feb. 14, 2024

(65) Prior Publication Data

US 2024/0276075 A1 Aug. 15, 2024

Related U.S. Application Data

(60) Provisional application No. 63/445,761, filed on Feb. 15, 2023.

(51) Int. Cl.

| | |
|---|---|
| *H04L 29/06* | (2006.01) |
| *G10L 19/018* | (2013.01) |
| *H04L 9/30* | (2006.01) |
| *H04L 9/32* | (2006.01) |
| *H04L 67/10* | (2022.01) |
| *H04N 21/8358* | (2011.01) |

(52) U.S. Cl.
CPC ....... *H04N 21/8358* (2013.01); *G10L 19/018* (2013.01); *H04L 9/30* (2013.01); *H04L 9/3247* (2013.01); *H04L 67/10* (2013.01)

(58) Field of Classification Search
CPC ....... H04N 21/8358; H04L 67/10; H04L 9/30; H04L 9/3247
See application file for complete search history.

(56) References Cited

U.S. PATENT DOCUMENTS

| | | | | |
|---|---|---|---|---|
| 2015/0296186 A1* | 10/2015 | Renkis | ................ | H04L 67/1097 348/159 |
| 2016/0021344 A1* | 1/2016 | Renkis | .................... | H04L 67/10 901/1 |
| 2017/0323398 A1* | 11/2017 | Dintenfass | ............ | G06F 16/248 |
| 2018/0343224 A1* | 11/2018 | Lord | .................. | H04N 21/2665 |
| 2019/0266800 A1* | 8/2019 | Khalid | ............. | H04N 21/44008 |
| 2022/0408165 A1* | 12/2022 | Speasl | ....................... | H04L 9/30 |
| 2024/0276075 A1* | 8/2024 | Miller | ................ | H04N 21/8358 |

* cited by examiner

*Primary Examiner* — Dao Q Ho

(74) *Attorney, Agent, or Firm* — Cesari and McKenna, LLP

(57) ABSTRACT

A method for embedding provenance data in a user-captured video by a mobile computing device at a live event includes receiving a real-time audio stream including an embedded audio signature key and a secure certificate corresponding to the live event. The method also includes generating geofence verification data based on GPS data of the mobile computing device and GPS coordinates corresponding to the live event. The method also includes generating a master signature key based on the embedded audio signature key, the secure certificate corresponding to the live event, and the generated verification data. The method also includes embedding the master signature key in a user-captured live event video.

20 Claims, 3 Drawing Sheets

SYSTEMS AND METHODS FOR PROVENANCE VERIFICATION OF USER-CAPTURED LIVE EVENT VIDEO

RELATED APPLICATION(S)

This application claims priority to U.S. Provisional Patent Application No. 63/445,761, filed on Feb. 15, 2023, the entirety of which is incorporated herein by reference.

FIELD OF THE INVENTION

This invention relates generally to the field of integration of real-time live event audio with user-captured video. More specifically, the invention relates to systems and methods for analyzing user-captured live event video for provenance verification.

BACKGROUND

Users attending live events often capture audio and video using their mobile computing devices with the intention of sharing their experiences on social media. There is a growing concern that these user-captured live event videos can be altered or otherwise "deep faked" when shared. There are software tools for verifying provenance data of digital content. However, these software tools are focused on digital verification of ownership, and do not focus on other aspects such as proof of location and time of recording. Therefore, there is a need for systems and methods that allow for user-captured live event videos to be truly appreciated for its raw form without concern for it having been altered or otherwise "deep faked."

SUMMARY

To overcome the above-described technical challenges, the present invention includes systems and methods for verifying provenance data of user-captured live event video. For example, the present invention includes systems and methods for embedding provenance data in a user-captured live event video. The present invention also includes systems and methods for receiving a real-time audio stream having an embedded audio signature key and a secure certificate corresponding to the live event. The present invention also includes systems and methods for generating geofence verification data based on GPS data. The present invention also includes systems and methods for generating a master signature key based on the embedded audio signature key, the secure certificate corresponding to the live event, and the generated geofence verification data. The present invention also includes systems and methods for embedding the master signature key in a user-captured live event video.

In one aspect, the invention includes a computerized method for embedding provenance data in a user-captured live event video. The computerized method includes receiving a real-time audio stream corresponding to a live event by a mobile computing device at the live event. The real-time audio stream includes an embedded audio signature key. The computerized method also includes receiving a secure certificate corresponding to the live event by the mobile computing device at the live event. The computerized method also includes generating geofence verification data based on GPS data of the mobile computing device and GPS coordinates corresponding to the live event. The computerized method also includes generating a master signature key based on the embedded audio signature key, the secure certificate corresponding to the live event, and the generated geofence verification data. The computerized method also includes embedding the master signature key in a user-captured live event video.

In some embodiments, receiving the real-time audio stream corresponding to the live event further includes receiving a data representation of a live audio signal corresponding to the live event from an audio server computing device via a wireless network. For example, in some embodiments, the computerized method further includes processing the data representation of the live audio signal into the real-time audio stream. In some embodiments, the computerized method further includes receiving the secure certificate corresponding to the live event from the audio server computing device via the wireless network.

In some embodiments, the computerized method further includes initiating a video capture corresponding to the live event by the mobile computing device at the live event. For example, in some embodiments, the computerized method further includes, concurrent with the video capture, producing the user-captured live event video based on the captured video and the real-time audio stream.

In other embodiments, the computerized method further includes embedding the master signature key in an audio track of the user-captured video by the mobile computing device at the live event.

In another aspect, the invention includes a mobile computing device for embedding provenance data in a user-captured video at a live event. The mobile computing device is configured to receive a real-time audio stream corresponding to a live event, the real-time audio stream including an embedded audio signature key. The mobile computing device is also configured to receive a secure certificate corresponding to the live event. The mobile computing device is also configured to generate geofence verification data based on GPS data of the mobile computing device and GPS coordinates corresponding to the live event. The mobile computing device is also configured to generate a master signature key based on the embedded audio signature key, the secure certificate corresponding to the live event, and the generated geofence verification data. The mobile computing device is also configured to embed the master signature key in a user-captured live event video.

In some embodiments, the mobile computing device is further configured to receive a data representation of a live audio signal corresponding to the live event from an audio server computing device via a wireless network. For example, in some embodiments, the mobile computing device is further configured to process the data representation of the live audio signal into the real-time audio stream. In some embodiments, the mobile computing device is further configured to receive the secure certificate corresponding to the live event from the audio server computing device via the wireless network.

In some embodiments, the mobile computing device is further configured to initiate a video capture corresponding to the live event. For example, in some embodiments, the mobile computing device is further configured to, concurrent with the video capture, produce the user-captured live event video based on the captured video and the real-time audio stream.

In other embodiments, the mobile computing device is further configured to embed the master signature key in an audio track of the user-captured video.

In another aspect, the invention includes a system for embedding provenance data in a user-captured video at a live event. The system includes a mobile computing device communicatively coupled to an audio server computing device over a wireless network. The mobile computing device is configured to receive a real-time audio stream corresponding to a live event, the real-time audio stream including an embedded audio signature key. The mobile computing device is also configured to receive a secure certificate corresponding to the live event.

The mobile computing device is also configured to generate geofence verification data based on GPS data of the mobile computing device and GPS coordinates corresponding to the live event. The mobile computing device is also configured to generate a master signature key based on the embedded audio signature key, the secure certificate corresponding to the live event, and the generated geofence verification data. The mobile computing device is also configured to embed the master signature key in a user-captured live event video.

In some embodiments, the mobile computing device is further configured to receive a data representation of a live audio signal corresponding to the live event from the audio server computing device via the wireless network. For example, in some embodiments, the mobile computing device is further configured to process the data representation of the live audio signal into the real-time audio stream. In some embodiments, the mobile computing device is further configured to receive the secure certificate corresponding to the live event from the audio server computing device via the wireless network.

In some embodiments, the mobile computing device is further configured to initiate a video capture corresponding to the live event. For example, in some embodiments, the mobile computing device is further configured to, concurrent with the video capture, produce the user-captured live event video based on the captured video and the real-time audio stream.

In other embodiments, the mobile computing device is further configured to embed the master signature key in an audio track of the user-captured video.

In some embodiments, the system further includes a validation server computing device. For example, in some embodiments, the validation server computing device is configured to independently generate the master signature key based on the embedded audio signature key, the secure certificate corresponding to the live event, and the GPS coordinates corresponding to the live event. In some embodiments, the validation server computing device is further configured to receive the user-captured live event video comprising the embedded master signature key and validate the user-captured live event video based on the embedded master signature key and the independently generated master signature key.

These and other aspects of the invention will be more readily understood from the following descriptions of the invention, when taken in conjunction with the accompanying drawings and claims.

DETAILED DESCRIPTION

Figure 1:
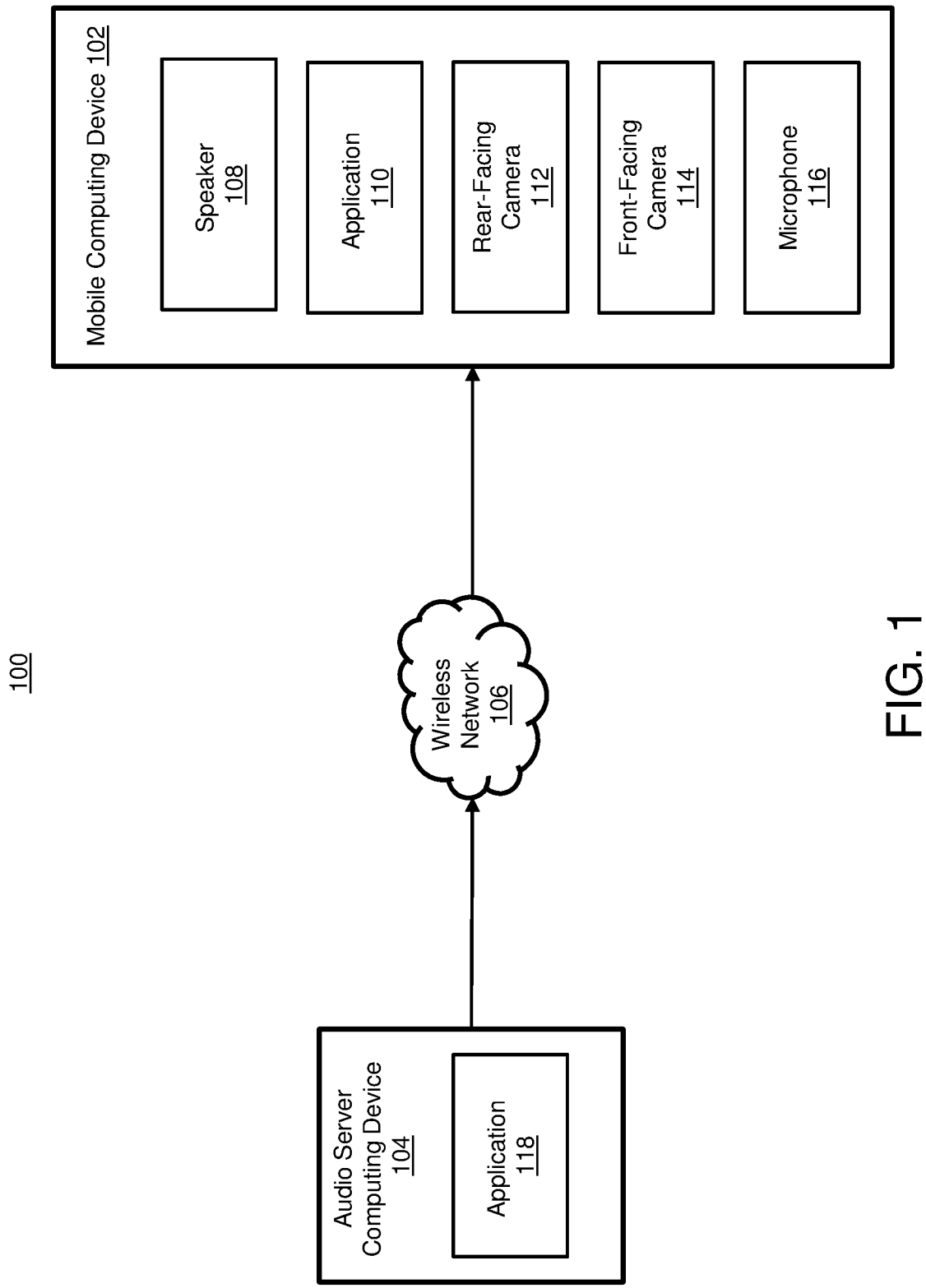
FIG. 1 is a schematic diagram of a system architecture for wireless capture of real-time audio and video at a live event using a mobile computing device, according to an illustrative embodiment of the invention.

FIG. 1 is a schematic diagram of a system architecture 100 for wireless capture of real-time audio and video at a live event using a mobile computing device, according to an illustrative embodiment of the invention. System 100 includes a mobile computing device 102 communicatively coupled to an audio server computing device 104 over a wireless network 106. Mobile computing device 102 includes a speaker 108, an application 110, a rear-facing camera 112, a front-facing camera 114, and a microphone 116. Audio server computing device 104 includes application 118.

Mobile computing device 102 is configured to receive instructions from application 110 in order to wirelessly capture real-time audio and video at a live event. For example, mobile computing device 102 is configured to receive a data representation of a live audio signal corresponding to the live event (e.g., from audio server computing device 104) via wireless network 106. Mobile computing device 102 is also configured to process the data representation of the live audio signal into a live audio stream. Mobile computing device 102 is also configured to initiate a video capture corresponding to the live event. For example, in some embodiments, a user attending the live event initiates the video capture using application 110.

Mobile computing device 102 is also configured to, concurrent with the video capture, produce a shareable video corresponding to the live event based on the captured video and the live audio stream. The produced shareable video combines high quality audio from the live audio stream with video captured by and from the perspective of a user attending the live event. For example, in some embodiments, mobile computing device 102 is further configured to upload the produced shareable video to a social network. For example, the mobile computing device 102 can be configured to transmit the produced shareable video via the wireless network 106 to a server computing device associated with the social network (not shown). Exemplary social networks include, but are not limited to, Facebook®, Instagram®, TikTok®, and YouTube®. In some embodiments, mobile computing device 102 is configured to receive the data representation of the live audio signal corresponding to the live event from the audio server computing device 104 via the wireless network 106.

In some embodiments, video capture includes ambient audio captured by one or more microphones 116 of mobile computing device 102. As an example, the ambient audio can comprise audio that corresponds to the live audio stream (i.e., audio relating to one or more performers at the live event, such as musicians on stage), but is being emitted by loudspeakers and captured by microphone 116 of the mobile computing device. The ambient audio captured by microphone 116 can also include audio from various sources in proximity to mobile computing device 102, such as audience members, announcers, and other sources in the surrounding environment. In some embodiments, the produced shareable video includes the ambient audio from the video capture. In some embodiments, an audio mix including the live audio stream and the ambient audio is configurable by a user of mobile computing device 102 via application 110. In some embodiments, each of the live audio stream and the ambient audio is received by application 110 as a separate channel, and a user of mobile computing device 102 can adjust a relative volume of each channel to produce an audio mix that comprises both the live audio stream and the ambient audio according to the relative volume settings. For example, application 110 can display a slider or knob to the user, with an indicator set to a middle position (indicating an equally balanced mix between the live audio stream and the ambient audio). When the user adjusts the indicator in one direction (e.g., left), application 110 can increase the relative volume of the live audio stream and reduce the relative volume of the ambient audio. Similarly, when the user adjust the indicator in the other direction (e.g., right), application 110 can increase the relative volume of the ambient audio and decrease the relative volume of the live audio stream.

In some embodiments, the video capture includes a first video feed from a rear-facing camera 112 of mobile computing device 102 and a second video feed from a front-facing camera 114 of mobile computing device 102. For example, in some embodiments, the produced shareable video includes video from the first video feed and the second video feed. In one example, the user can hold mobile computing device 102 such that the field of view of rear-facing camera 112 is pointing toward the live event (e.g., at the performers on stage) while the field of view of front-facing camera 114 is pointing toward the user (e.g., to capture the user's reaction to the performance). In some embodiments, each of these video feeds is captured by mobile computing device 102 as a separate video file or stream. In some embodiments, mobile computing device 102 combines the first video feed and the second video feed into a combined video capture—for example, the second video feed from front-facing camera 114 can be overlaid in a portion (e.g., a corner) of the first video feed from rear-facing camera 112 so that each of the video feeds can be seen concurrently.

In some configurations, system 100 includes a headphone (not shown) communicatively coupled to the mobile computing device 102. The headphone may include a microphone (in addition to microphone 116). For example, in some embodiments, the mobile computing device 102 is configured to capture ambient audio using the headphone's microphone. In some embodiments, the mobile computing device 102 is configured to capture ambient audio using the headphone's microphone in response to the user initiating a camera flip using the application 110.

Exemplary mobile computing devices 102 include, but are not limited to, tablets and smartphones, such as Apple® iPhone®, iPad® and other iOS®-based devices, and Samsung® Galaxy®, Galaxy Tab™ and other Android™-based devices. It should be appreciated that other types of computing devices capable of connecting to and/or interacting with the components of system 100 can be used without departing from the scope of invention. Although FIG. 1 depicts a single mobile computing device 102, it should be appreciated that system 100 can include a plurality of mobile computing devices. An exemplary application 110 can be an app downloaded to and installed on mobile computing device 102 via, e.g., the Apple® App Store or the Google® Play Store. The user can launch application 110 on mobile computing device 102 and interact with one or more user interface elements displayed by the application 110 on a screen of mobile computing device 102 to begin receiving a live audio signal from audio server computing device 104 and/or to begin capturing video and/or ambient audio at the live event.

Audio server computing device 104 is a computing device including specialized hardware and/or software modules (e.g., application 118) that execute on one or more processors and interact with memory modules of server computing device 104, to receive data from other components of system 100, transmit data to other components of system 100, and perform functions for real-time delivery of data as described herein, including but not limited to live audio and/or video data. In some embodiments, the audio server computing device 104 is communicatively coupled to an audio interface (not shown).

In some embodiments, audio server computing device 104 can pre-process the live audio signal when generating the data representation of the live audio signal prior to transmission to mobile computing devices. For example, audio server computing device 104 can generate one or more data packets corresponding to the live audio signal. In some embodiments, creating a data representation of the live audio signal includes using one of the following compression codecs: AAC, HE-AAC MP3, MPE VBR, Apple Lossless, IMA4, IMA ADPCM, or Opus.

Wireless network 106 is configured to communicate electronically with network hardware of audio server computing device 104 and to transmit the data representation of the live audio signal to mobile computing device 102. In some embodiments, network 104 can support one or more routing schemes, e.g., unicast, multicast and/or broadcast.

Additional detail regarding illustrative technical features of the methods and systems described herein—including, but not limited to, wireless capture and transmission of real-time audio and video at live events—are found in: U.S. Pat. No. 11,461,070, titled "Systems and Methods for Providing Real-Time Audio and Data" and issued Oct. 24, 2022; U.S. Pat. No. 11,625,213, titled "Systems and Methods for Providing Real-Time Audio and Data," and issued Apr. 11, 2023; U.S. application Ser. No. 18/219,778, filed on Jul. 10, 2023 and published as U.S. Patent Application Publication No. 2024/0022769; and U.S. application Ser. No. 18/219, 792, filed on Jul. 10, 2023 and published as U.S. Patent Application Publication No. 2024/0021218, the entirety of each of which is incorporated herein by reference.

Figure 2:
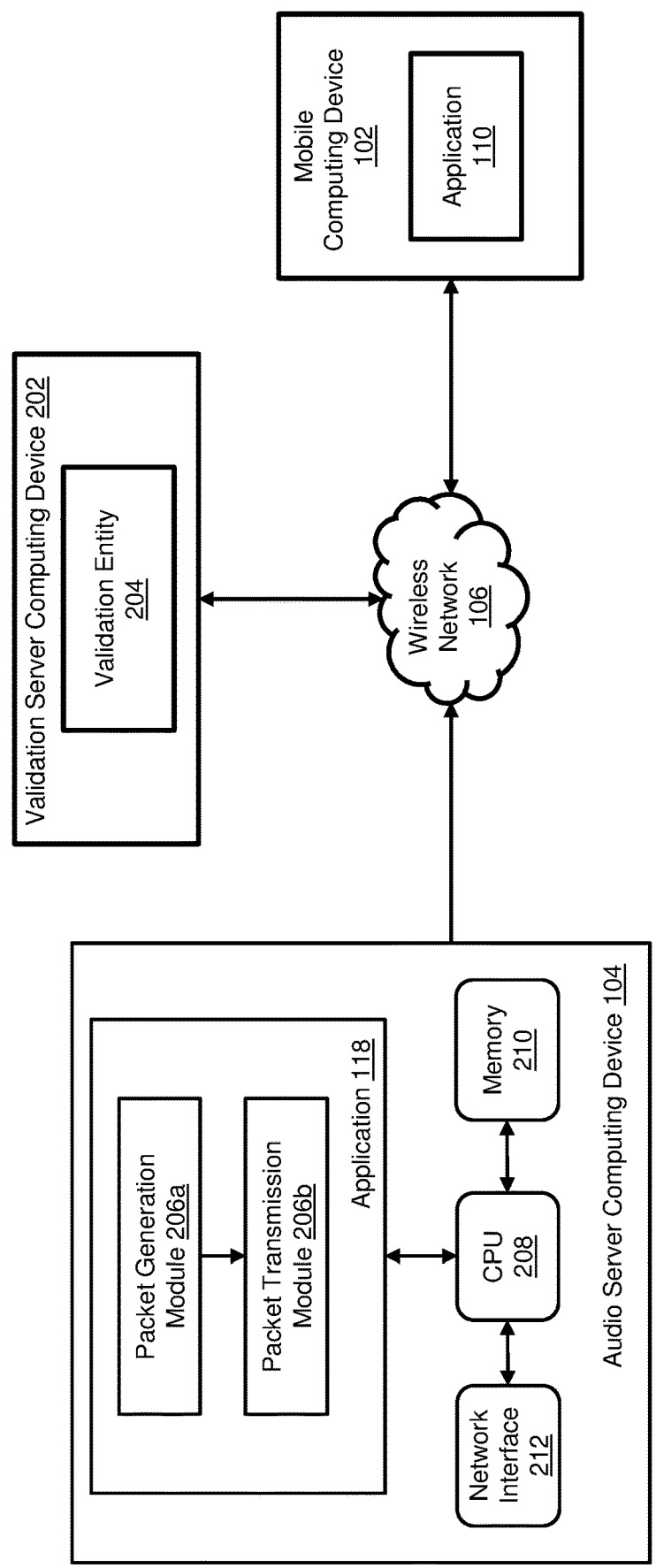
FIG. 2 is a schematic diagram of a system architecture for verifying provenance data of user-captured live event video, according to an illustrative embodiment of the invention.

FIG. 2 is a schematic diagram of a system architecture 200 for verifying provenance data of user-captured live event video, according to an illustrative embodiment of the invention. System 200 includes mobile computing device 102 communicatively coupled to audio server computing device 104 and validation server computing device 202 over wireless network 106. As described above, mobile computing device 102 is configured to receive a real-time audio stream corresponding to a live event from audio server computing device 104 via application 110.

Audio server computing device 104 includes application 118 with packet generation module 206a and packet transmission module 206b. Audio server computing device 104 also includes CPU 208, memory 210, and network interface 212 (e.g., hardware that enables device 104 to connect to network 106). Packet generation module 206a is configured to generate network data packets comprising an audio signal. Packet transmission module 206b is configured to transmit the generated network data packets to network 106. In some embodiments, the audio signal corresponds to a data representation of a live audio signal associated with a live event (e.g., concert, sporting event, etc.). In these embodiments, audio server computing device 104 can receive the audio signal as, e.g., a data stream from an audio interface such as another computing device and/or a soundboard at the live event. Generally, modules 206a and 206b of application 118 are specialized sets of computer software instructions which execute on one or more processors of audio server computing device 104 (e.g., CPU 208). In some embodiments, modules 206a and 206b can specify designated memory locations and/or registers for executing the specialized computer software instructions.

In some embodiments, when generating the network data packets comprising the live audio signal, packet generation module 206a includes an embedded audio signature key in the network data packets. Generally, the embedded audio signature key comprises an alphanumeric string that uniquely identifies the live audio signal. In some embodiments, the embedded audio signature key is generated by packet generation module 206a using a cryptographic framework—such as asymmetric cryptography. In one example, module 206a creates the embedded audio signature key using a public key algorithm such as an elliptic curve cryptography (ECC) algorithm or an RSA algorithm. In this example, the embedded audio signature key is akin to a private key in an asymmetric cryptography paradigm. Module 206a then embeds the audio signature key in one or more packets of the live audio stream (e.g., in packet headers and/or metadata) prior to transmission by packet transmission module 206b. In some embodiments, module 206a embeds the audio signature key using one or more digital watermarking techniques, such as discrete wavelet transform (DWT) processing (as described in K. Badhe and J. Panchal, "Implementation of Audio Watermarking using Wavelet Families," International Journal of Electronics Communication and Computer Engineering, Vol. 5, Issue (4) July, Technovision-2014 April 5-6, 2014, pp. 139-143, which is incorporated herein by reference). It should be appreciated, however, that other methodologies for embedding the audio signature key in the network data packets can be used within the scope of the technology described herein. Mobile computing device 102 receives the network data packets from module 206b via network 106 and processes the data representation of the live audio signal into the real-time audio stream. In some embodiments, during processing of the live audio signal, mobile computing device 102 extracts the embedded audio signature key from the data packets.

Mobile computing device is 102 also configured to receive a secure certificate corresponding to the live event. In some embodiments, mobile computing device 102 receives the secure certificate corresponding to the live event from audio server computing device 104 via wireless network 106. For example, upon establishing a connection to audio server computing device 104 via network 106, mobile computing device 102 receives the secure certificate from audio server computing device 104, e.g., prior to receiving the network data packets that comprise the live audio signal. As can be appreciated, in some embodiments the secure certificate is issued by a Certificate Authority (CA) and is used to verify the identity of audio server computing device 104. Audio server computing device 104 can store the secure certificate in local memory for distribution to mobile computing devices 102 at the live event. In some embodiments, the secure certificate comprises a plurality of data fields, such as: the name of the certificate holder, an identification number used to uniquely identify the certificate, expiration date(s), digital signature of the CA, and a copy of the public key corresponding to the audio signature key.

Mobile computing device 102 is also configured to generate geofence verification data based on GPS data of mobile computing device 102 and GPS coordinates corresponding to the live event. In some embodiments, mobile computing device 102 includes application software and/or hardware (e.g., GPS receiver or other cellular networking interface) that is configured to capture and maintain GPS data corresponding to a location of mobile computing device 102. In some embodiments, upon establishing a connection to audio server computing device 104 via network 106, mobile computing device 102 receives GPS coordinates and/or other location data associated with the live event from audio server computing device 104. In one example, the GPS coordinates associated with the live event comprise a latitude and longitude of the location at which the live event is taking place. To generate the geofence verification data, mobile computing device 102 compares the GPS coordinates associated with the live event to the GPS data associated with the mobile computing device. When the mobile device GPS data either matches the live event GPS coordinates, or is within a defined proximity threshold to the live event GPS coordinates (e.g., 100 feet, 500 feet, 100 yards, etc.), mobile computing device 102 generates geofence verification data (such as a binary indicator or other data value) that confirms the mobile device is physically located at the live event. In some embodiments, the geofence verification data includes all or a portion of the GPS data associated with the mobile computing device and/or the GPS coordinates associated with the live event.

In another example, the GPS coordinates associated with the live event comprise a plurality of latitude/longitude pairs that define a geographical boundary (or geofence) for the location of the live event. To generate the geofence verification data, mobile computing device 102 determines whether the GPS data associated with the mobile computing device is within the boundary defined by the plurality of latitude/longitude pairs in the GPS coordinates for the live event. When the mobile device GPS data is within the geofence boundary, mobile computing device 102 generates geofence verification data that confirms the mobile device is physically located at the live event.

Mobile computing device 102 is also configured to generate a master signature key based on the embedded audio signature key, the secure certificate corresponding to the live event, and the generated geofence verification data. Generally, the master signature key comprises an alphanumeric string that uniquely identifies live event video and audio captured by mobile computing device 102. In some embodiments, mobile computing device 102 uses a cryptographic algorithm (e.g., a public key algorithm) to generate the master signature key based on the embedded audio signature key, the secure certificate corresponding to the live event, and the generated geofence verification data.

Mobile computing device 102 is also configured to embed the master signature key in a user-captured live event video. As described above, in some embodiments mobile computing device 102 is configured to initiate a video capture corresponding to the live event and, concurrent with the video capture, produce a user-captured live event video based on the captured video and the real-time audio stream. During generation of the user-captured live event video, mobile computing device 102 can embed the master signature key in one or more frames of the live event video and/or in metadata associated with the live event video. In some embodiments, mobile computing device 102 is configured to embed the master signature key in an audio track of the user-captured live event video (either instead of, or in addition to, embedding the master signature key in one or more frames or metadata of the live event video).

As shown in FIG. 2, system 200 further includes validation server computing device 202 having validation entity

210. In some embodiments, validation entity 210 is a web service or a mobile software development kit (SDK) application programming interface (API) hosted by validation server computing device 202. For example, in some embodiments, validation server computing device 202 is configured to receive the embedded audio signature key, the secure certificate corresponding to the live event, and the GPS coordinates corresponding to the live event from, e.g., audio server computing device 104 and use the received information to independently generate the master signature key (in a similar fashion as described above with respect to mobile computing device 102). In some embodiments, validation server computing device 202 receives the user-captured live event video comprising the embedded master signature key from, e.g., mobile computing device 102, and validates the user-captured live event video based on the embedded master signature key and the independently generated master signature key. For example, validation entity 210 can compare the embedded master signature key from the user-captured live event video to the independently generated master signature key. When the two signature keys match, validation entity 210 confirms the authenticity and provenance of the user-captured live event video in a number of ways, including confirmation that (i) the mobile computing device that captured the video is physically located at the live event (based on the geofence validation); (ii) the live event audio incorporated into the user-captured video originated from audio server computing device 104 (based on the embedded audio signature key); and (iii) the live event audio originated from an authentic live event source (based on the secure certificate).

Figure 3:
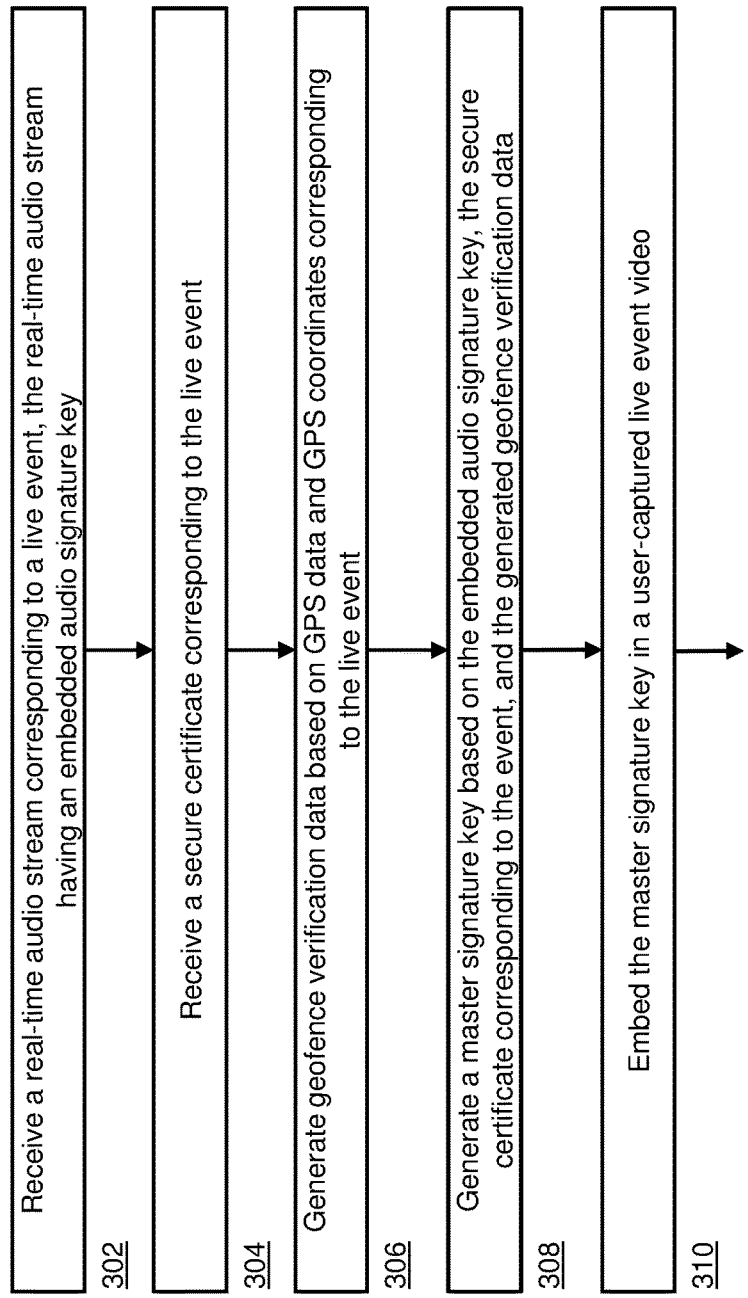
FIG. 3 is a schematic flow diagram of a process for embedding provenance data in a user-captured video at a live event using the system architecture of FIG. 2, according to an illustrative embodiment of the invention.

FIG. 3 is a schematic flow diagram of a process 300 for embedding provenance data in a user-captured video at a live event using system architecture 200, according to an illustrative embodiment of the invention. Process 300 begins by receiving a real-time audio stream corresponding to a live event by a mobile computing device 102 at the live event at step 302. The real-time audio stream includes an embedded audio signature key. For example, in some embodiments, receiving the real-time audio stream corresponding to the live event further includes receiving a data representation of a live audio signal corresponding to the live event from an audio server computing device 104 via a wireless network 106. In some embodiments, process 300 further includes processing the data representation of the live audio signal into the real-time audio stream.

Process 300 continues by receiving a secure certificate corresponding to the live event by the mobile computing device 102 at the live event at step 304. For example, in some embodiments, process 300 further includes receiving the secure certificate corresponding to the live event from the audio server computing device 104 via the wireless network 106.

Process 300 continues by generating geofence verification data based on GPS data of the mobile computing device 102 and GPS coordinates corresponding to the live event at step 306. Process 300 continues by generating a master signature key based on the embedded audio signature key, the secure certificate corresponding to the live event, and the generated geofence verification data at step 308.

In some embodiments, process 300 further includes initiating a video capture corresponding to the live event by the mobile computing device 102 at the live event. For example, in some embodiments, process 300 further includes, concurrent with the video capture, producing a user-captured live event video based on the captured video and the real-time audio stream.

Process 300 finishes by embedding the master signature key in a user-captured live event video at step 310. For example, in some embodiments, process 300 further includes embedding the master signature key in an audio track of the user-captured video by the mobile computing device 102 at the live event.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM® Cloud).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random-access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD™, HD-DVD™, and Blu-ray™ disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above-described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above-described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth®, near field communications (NFC) network, Wi-Fi™, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Edge™ available from Microsoft Corporation, and/or Mozilla® Firefox available from Mozilla Corporation). Mobile computing device include, for example, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

The systems and methods described herein can be implemented using supervised learning and/or machine learning algorithms. Supervised learning is the machine learning task of learning a function that maps an input to an output based on example of input-output pairs. It infers a function from labeled training data consisting of a set of training examples. Each example is a pair consisting of an input object and a desired output value. A supervised learning algorithm or machine learning algorithm analyzes the training data and produces an inferred function, which can be used for mapping new examples.

Comprise, include, and/or plural forms of each are open ended and include the listed parts and can include additional parts that are not listed. And/or is open ended and includes one or more of the listed parts and combinations of the listed parts.

While the invention has been particularly shown and described with reference to specific preferred embodiments, it should be understood by those skilled in the art that various changes in form and detail may be made therein without departing from the spirit and scope of the invention as defined by the following claims.

What is claimed is:

1. A computerized method for embedding provenance data in a user-captured live event video, the method comprising:
receiving, by a mobile computing device at a live event, a real-time audio stream corresponding to the live event,
wherein the real-time audio stream comprises an embedded audio signature key;
receiving, by the mobile computing device at the live event, a secure certificate corresponding to the live event;
generating, by the mobile computing device at the live event, geofence verification data based on GPS data of the mobile computing device and GPS coordinates corresponding to the live event;
generating, by the mobile computing device at the live event, a master signature key based on the embedded audio signature key, the secure certificate corresponding to the live event, and the generated geofence verification data; and
embedding, by the mobile computing device at the live event, the master signature key in a user-captured live event video.

2. The computerized method of claim 1, wherein receiving the real-time audio stream corresponding to the live event comprises:
receiving, by the mobile computing device at the live event, a data representation of a live audio signal corresponding to the live event from an audio server computing device via a wireless network; and processing, by the mobile computing device at the live event, the data representation of the live audio signal into the real-time audio stream.

3. The computerized method of claim 2, further comprising receiving, by the mobile computing device at the live event, the secure certificate corresponding to the live event from the audio server computing device via the wireless network.

4. The computerized method of claim 1, further comprising initiating, by the mobile computing device at the live event, a video capture corresponding to the live event.

5. The computerized method of claim 4, further comprising producing, concurrent with the video capture, by the mobile computing device at the live event, the user-captured live event video based on the captured video and the real-time audio stream.

6. The computerized method of claim 1, further comprising embedding, by the mobile computing device at the live event, the master signature key in an audio track of the user-captured live event video.

7. A mobile computing device for embedding provenance data in a user-captured video at a live event, the mobile computing device configured to:
receive a real-time audio stream corresponding to the live event, wherein the real-time audio stream comprises an embedded audio signature key;
receive a secure certificate corresponding to the live event;
generate geofence verification data based on GPS data of the mobile computing device and GPS coordinates corresponding to the live event;
generate a master signature key based on the embedded audio signature key, the secure certificate corresponding to the live event, and the generated geofence verification data; and
embed the master signature key in a user-captured live event video.

8. The mobile computing device of claim 7, wherein the mobile computing device is further configured to:
receive a data representation of a live audio signal corresponding to the live event from an audio server computing device via a wireless network; and
process the data representation of the live audio signal into the real-time audio stream.

9. The mobile computing device of claim 8, wherein the mobile computing device is further configured to receive the secure certificate corresponding to the live event from the audio server computing device via the wireless network.

10. The mobile computing device of claim 7, wherein the mobile computing device is further configured to initiate a video capture corresponding to the live event.

11. The mobile computing device of claim 10, wherein the mobile computing device is further configured to produce, concurrent with the video capture, the user-captured live event video based on the captured video and the real-time audio stream.

12. The mobile computing device of claim 7, wherein the mobile computing device is further configured to embed the master signature key in an audio track of the user-captured live event video.

13. A system for embedding provenance data in a user-captured video at a live event, the system comprising a mobile computing device communicatively coupled to an audio server computing device over a wireless network, the mobile computing device configured to:
receive a real-time audio stream corresponding to the live event,
wherein the real-time audio stream comprises an embedded audio signature key;
receive a secure certificate corresponding to the live event;
generate geofence verification data based on GPS data of the mobile computing device and GPS coordinates corresponding to the live event;
generate a master signature key based on the embedded audio signature key, the secure certificate corresponding to the live event, and the generated geofence verification data; and
embed the master signature key in a user-captured live event video.

14. The system of claim 13, wherein the mobile computing device is further configured to:
receive a data representation of a live audio signal corresponding to the live event from the audio server computing device via the wireless network; and
process the data representation of the live audio signal into the real-time audio stream.

15. The system of claim 14, wherein the mobile computing device is further configured to receive the secure certificate corresponding to the live event from the audio server computing device via the wireless network.

16. The system of claim 13, wherein the mobile computing device is further configured to initiate a video capture corresponding to the live event.

17. The system of claim 16, wherein the mobile computing device is further configured to produce, concurrent with the video capture, the user-captured live event video based on the captured video and the real-time audio stream.

18. The system of claim 13, wherein the mobile computing device is further configured to embed the master signature key in an audio track of the user-captured live event video.

19. The system of claim 13, further comprising a validation server computing device configured to independently generate the master signature key based on the embedded audio signature key, the secure certificate corresponding to the live event, and the GPS coordinates corresponding to the live event.

20. The system of claim 19, wherein the validation server computing device is further configured to:
receive the user-captured live event video comprising the embedded master signature key; and
validate the user-captured live event video based on the embedded master signature key and the independently generated master signature key.

* * * * *